Aug. 5, 1952     F. E. BONNER ET AL     2,606,046
FLUID PACKING SEAL

Filed Dec. 1, 1949

INVENTOR
HERMAN NACK
FRANK E. BONNER by *Toulmin & Toulmin*
ATTORNEYS

Patented Aug. 5, 1952

2,606,046

UNITED STATES PATENT OFFICE 2,606,046

FLUID PACKING SEAL

Frank E. Bonner, Dayton, and Herman Nack, Troy, Ohio, assignors to The Commonwealth Engineering Company of Ohio, Dayton, Ohio, a corporation of Ohio Application December 1, 1949, Serial No. 130,492

2 Claims. (Cl. 286—26)

This invention relates to the art of packing seals. More particularly, it relates to sealing means for confining fluid mediums in chambers in which objects move. Still more particularly, it relates to the sealing of plating chambers in which decomposition of vaporous metal compounds frees toxic gases.

Deposition of thin films of protective metal, such as nickel, cobalt, tungsten, their alloys, and the like, has been accomplished in the past by enclosing an object to be plated in a chamber, charging the chamber with a decomposable metal-bearing gas and heating the object to a decomposition temperature for said gas.

Where objects have been passed in and out of a plating chamber, the procedure has been to pass, for example, sheet material through a water bath which acts as a seal for the gas chamber.

Such equipment as is shown in the Drummond Patent No. 2,332,309 is bulky and suffers from the disadvantage that the wetting of the metal passing through the water seal decreases the adhesion of metal deposited on the base.

It is an object of the present invention to overcome the disadvantages and limitations of the processes known heretofore.

It is also an object of the present invention to provide a seal operable under pressure conditions either above or below atmospheric pressure.

It is another object of the present invention to provide a seal which operates whether the fluid medium is liquid or gas.

It is still a further object of this invention to provide a seal which is capable of sealing against fluid leakage about moving irregular shapes or irregular surface configurations on the surface of said shapes.

Other and more specific objects and advantages will become apparent from the following description:

The seal of this invention comprises a shaped flexible unit or tube, inflated by the introduction of a fluid medium under any desired pressure, the expansion causing the tube to press against objects of any shape.

The shape of the inflatable unit is dependent upon the shape of the moving or movable object about which a seal is desired. An expandable tube can by design be made to surround substantially any perimeter regardless of shape.

The seal is adaptable for confining fluid in chambers by being positioned about rotor shaft of a pump, the valve stem of a valve, at the ends of plating boxes, to seal the pressure systems of hydraulic presses and like uses.

The type of seal is such that it lends itself readily to adaptation to such processes as gas plating, annealing, nitriding, and the like.

The flexible units or tubes may be prepared from natural rubber, synthetic rubbers such as polychloroprene, butadienestyrene, and like polymers.

The invention will be more fully understood by reference to the drawings, illustrating two different uses, in which.

Figure 1:
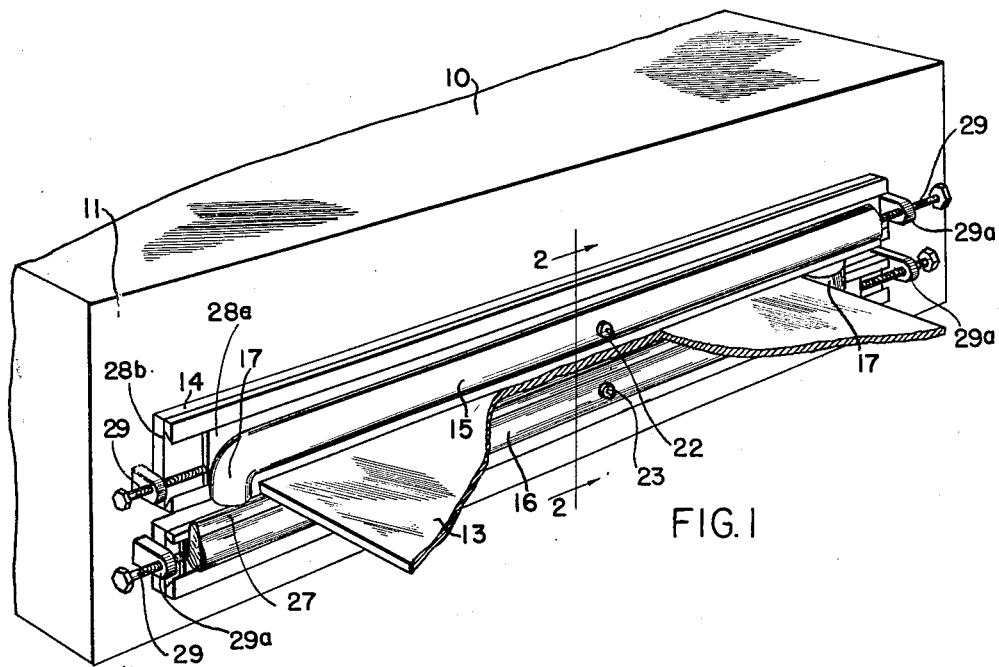
Figure 1 is a perspective view of the chamber and the seal upon moving plated steel sheet.
Figure 2:
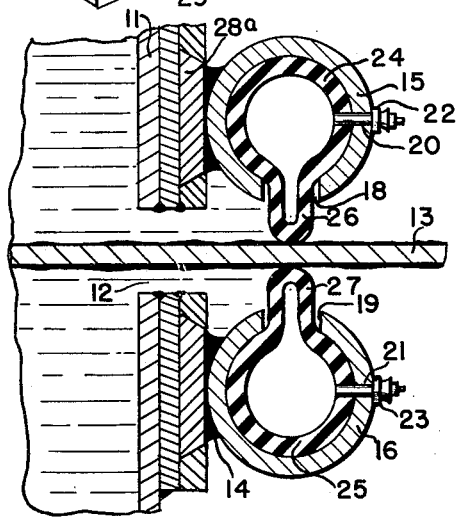
Figure 2 is a sectional view of the closure apparatus for the gas plating chamber along the line 2—2 of Figure 1.

Referring to Figure 1, there is shown a plating chamber 10 having an end wall 11. End wall 11 is provided with a horizontal slit 12 through which the plated sheet metal 13 issues.

It will, of course, be understood that identical means may be utilized to close the inlet end as well.

Adjacent the slit 12 and positioned above and below the slit, preferably on the outside of end wall 11 there is secured by suitable means 14, such as welding, a set of parallely positioned rigid enclosures or tubes 15 and 16.

Tubes 15 and 16 are of sufficient length to extend beyond the plate issuing from the chamber 10. The ends of the tubing are formed with a right angle turn as at 17.

Tubes 15 and 16 are slotted their entire length as at 18 and 19. The tubes 15 and 16 are also provided with apertures 20 and 21 adapted to receive the filling stems 22 and 23 of the flexible tubes 24 and 25.

Flexible tubes 24 and 25 are adapted to fit the circular interior of tubes 15 and 16 and are provided with U-shaped projections 26 and 27.

The flexible tubes enclosed in rigid tubes 15 and 16 extend in the portion 17 so as to contact the U-shaped projection of the companion tube. In this way an end sealing engagement of flexible tube contacting flexible tube is secured.

It will be noted that adjustment may be provided in order to compensate for variation in width of sheet. This is accomplished by affixing rigid tubes 15 and 16 to slides 28a operative in dovetail guides 28b. The adjustment is then effected by movement of the slides in response to set screws 29 threaded in ears 29a, which ears are affixed to the wall 11 of the housing 10.

The filling stems 22 and 23 extending through the apertures 20 and 21 in tubes 15 and 16 may be provided with suitable valve means and adapted for connection with a system for introducing the filling medium, such as air or fluids to inflate the seal.

When utilized as the seals for gas plating chambers wherein the decomposition of metal carbonyls produce toxic carbon monoxide, the seals prevent escape of the gas and the apparatus may be worked about without the necessity of utilizing gas masks for safety.

Figure 3:
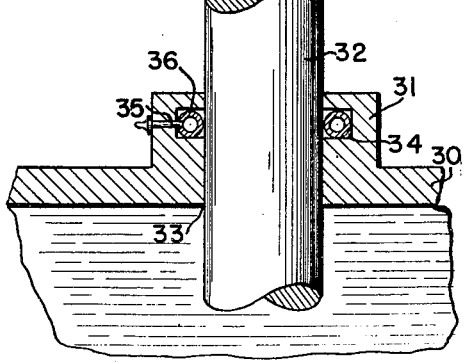
Figure 3 is a sectional view showing the adaptation of the unit of this invention to a pump shaft.

In Figure 3 an adaptation is shown where liquid under pressure is prevented from escaping along the pump shaft. The apparatus shown is a plate 30 for the face of a pump casing. The plate 30 is provided with an annular sleeve 31 which may be either integrally formed therewith or suitably connected thereto projecting on the external side of the plate. This annular sleeve is adapted to receive the shaft 32 in loose sliding fit in the central axial bore 33.

Sleeve 31 is provided with an annular slot 34. Sleeve 31 is also bored as at 35. Mounted in the slot 34 and having its filling tube extending through bore 35 is the inflatable sealing tube 36 of substantially circular cross section.

The inflated volume of the tube 36 being in excess of the volume of the annular slot 34, the tube, when inflated being confined on three sides, is extended in the direction of the fourth side and in contact with the pump shaft.

It will be recognized that the range of pressures on the fluid in the pump can be very great because the pressure within the inflated seal can be increased to exceed the pump pressure. The limit of pressure is the bursting pressure of the inflated tube and where confined in an annular slot, as shown, this pressure is very high.

While the method and apparatus disclosed and described herein illustrate a preferred form of invention, yet it will be understood that modifications can be made without departing from the spirit of the invention and that modifications that fall within the scope of the appended claims are intended to be included herein.

We claim:

1. Apparatus for sealing gas chamber openings through which metal strip material is moved which comprises rigid tubular means mounted on the walls of said chamber adjacent to said opening, said rigid tubular means being arranged at opposite sides of said opening, a slot in said tubular means extending lengthwise thereof and substantially parallel to the longitudinal axis of said chamber opening, an inflatable inner tube disposed in said tubular means, said inner tube having a flexible U-shaped portion disposed in and projecting from said slot upon inflation of said inner tube, and means comprising a valve and stem means connected to said inner tube for introducing gas into the tube to inflat the same and bring said U-shaped portion of the tube in contact with the metal strip at opposite sides thereof to thereby seal said opening against said strip.

2. Apparatus for sealing gas chamber openings through which metal strip material is moved which comprises rigid tubular means mounted on the walls of said chamber adjacent to said opening, said rigid tubular means being arranged at opposite sides of said opening, a slit in said tubular means extending lengthwise thereof and substantially parallel to the longitudinal axis of said chamber opening, an inflatable inner tube disposed in said tubular means, said inner tube having a flexible U-shaped portion disposed in and projecting from said slot upon inflation of said inner tube, said rigid tubular means having an aperture in the side wall thereof, means comprising a valve and stem means connected to said inner tube for introducing gas into the tube to inflate the same and bring said U-shaped portion of the tube in contact with the metal strip at opposite sides thereof to thereby seal said opening against said strip, and means comprising a slide mounting for said rigid tubular means whereby the same are slidably adjustable to accommodate metal strip material of different widths.

FRANK E. BONNER.
HERMAN NACK.

REFERENCES CITED

The following references are of record in the file of this patent:

UNITED STATES PATENTS

| Number | Name | Date |
|---|---|---|
| 2,075,899 | Humason | Apr. 6, 1937 |
| 2,212,588 | Csanyi | Aug. 27, 1940 |
| 2,300,385 | Kollberg et al. | Oct. 27, 1942 |

FOREIGN PATENTS

| Number | Country | Date |
|---|---|---|
| 268,391 | Great Britain | June 28, 1928 |
| 657,106 | France | May 17, 1929 |